Figure 1:
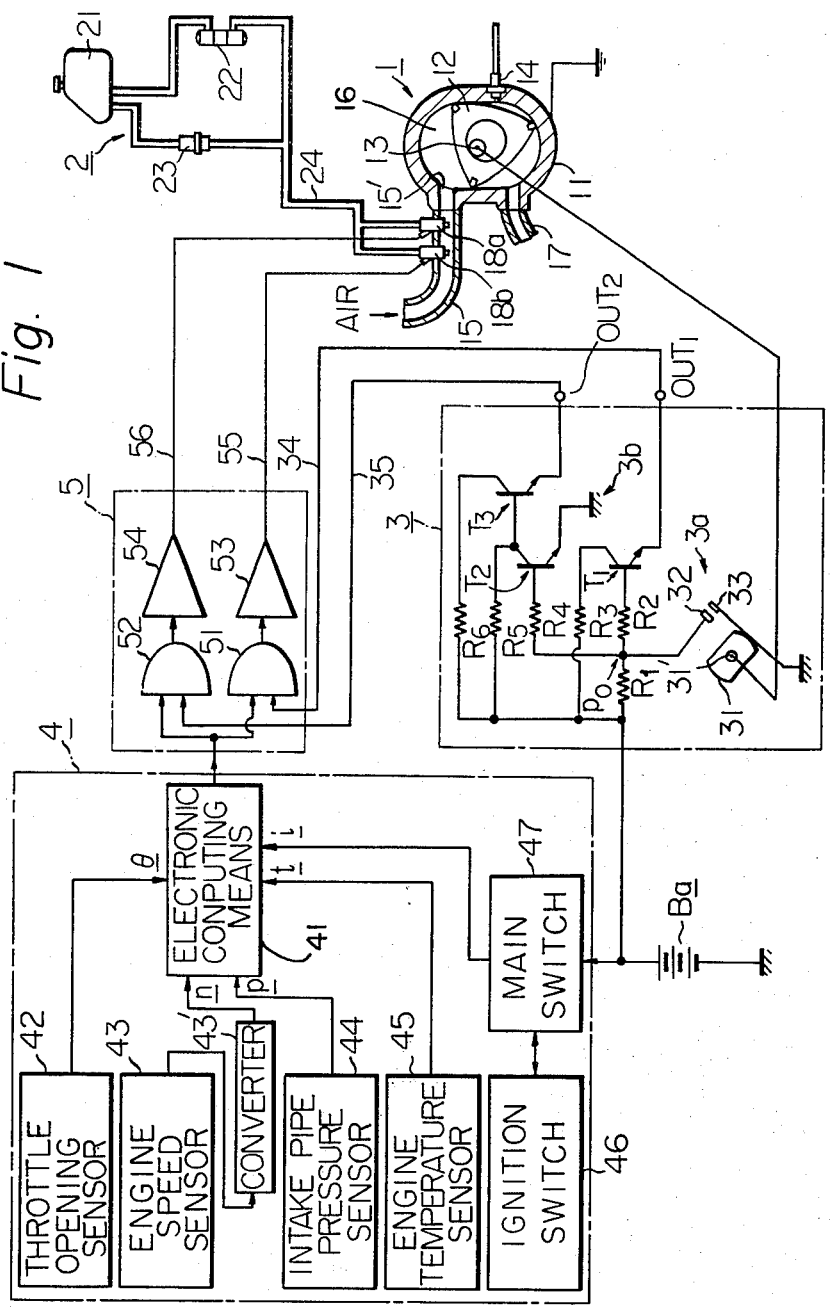

United States Patent [19]
Iwata et al.

[11] 3,908,609
[45] Sept. 30, 1975

[54] ELECTRONICALLY CONTROLLED FUEL INJECTION SYSTEM FOR ROTARY ENGINES

[75] Inventors: Hiroyoshi Iwata; Yoshikazu Ishikawa, both of Tokyo, Japan

[73] Assignee: Nissan Motor Company Limited, Yokohama, Japan

[22] Filed: June 6, 1973

[21] Appl. No.: 367,384

[30] Foreign Application Priority Data
June 7, 1973   Japan.......................... 47-67685[U]

[52] U.S. Cl......... 123/8.09; 123/32 EA; 123/119 R
[51] Int. Cl.²......................................... F02B 53/10
[58] Field of Search............ 123/8.09, 32 EA, 119 R

[56]         References Cited
             UNITED STATES PATENTS
3,522,794  8/1970  Reichardt..................... 123/32 EA
3,796,198  3/1974  Mauch et al. ................. 123/32 EA
       FOREIGN PATENTS OR APPLICATIONS
893,325   4/1962   United Kingdom............... 123/8.09

Primary Examiner—Charles J. Myhre
Assistant Examiner—Joseph Cangelosi

[57]          ABSTRACT

An electronic system for electronically controlling fuel injection valves to inject an desired amount of fuel into an intake pipe of a rotary combustion engine under all continuously variable engine operating conditions. In this system, there are mounted on the intake pipe a plurality of fuel injection valves which are sequentially actuated in response to command pulse signals having a pulse width representing a proper duration for fuel injection per one revolution of an engine crank shaft and corresponding at all times to prevailing engine operating conditions, so that the fuel injection valves alternate in their fuel injection operation. The command pulse signals occur sequentially in dependence on the revolution of the engine crank shaft.

1 Claim, 2 Drawing Figures

ELECTRONICALLY CONTROLLED FUEL INJECTION SYSTEM FOR ROTARY ENGINES

The present invention is generally concerned with a fuel injection system for an internal combustion engine and, more particularly, with an electronically controlled fuel injection system for a rotary combustion engine which is capable of electronically controlling fuel injection valves to inject a proper amount of fuel into an intake pipe of the rotary combustion engine under all continuously variable engine operating conditions by means of sequential command pulse signals having a pulse width representing a proper duration for fuel injection per one revolution of the engine crank shaft.

In conventional electronically controlled fuel injection systems for rotary combustion engines, fuel injection quantity is controlled by means of an electric pulse signal having a pulse width representing a proper duration for fuel injection per one revolution of the engine crank shaft under all continuously variable engine operating conditions. The pulse width of the pulse signal corresponds to an amount of fuel injected into the intake pipe for one revolution of the engine crank shaft. The pulse signal is produced from an electronic control circuitry when it receives electric signals representing prevailing values of engine operating conditions including engine speed, throttle opening, engine temperature and intake pipe pressure from the corresponding sensors. The pulse signal thus produced from the control circuitry is fed to a solenoid or electromagnetic type fuel injection valve in which fuel injection is effected. In this regard, it is appreciated that the pulse interval of the pulse signal shortens in inverse proportion as the engine speed rises so that, during the high-speed operation of the engine, the pulse signal is restricted in its pulse width representing the duration for fuel injection per one revolution of the engine crank shaft, that is, the fuel injected into the fuel injection valve is restricted in its quantity under variable engine operating conditions.

Thus, in a rotary combustion engine, for example, an epitrochoid "Wankel" type rotary combustion engine, there should be effected one fuel injection, in its principle, per one revolution of the engine crank shaft through the fuel injection valve into the intake pipe by means of the conventional electronically controlled fuel injection system mentioned above. This means that the number of the fuel injection in the rotary combustion engine is twice as compared with that of the fuel injection in a common reciprocating engine. Therefore, in the rotary combustion engine, the fuel to be injected into the intake pipe is particularly restricted in its quantity, since the pulse interval of the pulse signal shortens in inverse proportion as the engine speed rises, as mentioned above. If, thus, the conventional electronically controlled fuel injection system is applied to such a rotary combustion engine, the system does not function to actuate the fuel injection valve in such a manner as to inject an desired amount of fuel into the intake pipe under all variable engine operating conditions, especially during the high-speed operation of the engine.

In order to solve the problem mentioned above, it has been proposed to increase the pressure exerted on the fuel, which is led to the fuel injection valve, by a fuel pump, or to enlarge the effective cross-sectional area at the opening of the fuel injection valve so as to inject a sufficient amount of fuel into the intake pipe. However, in the former, the fuel flow rate is proportional to the square root of the pressure exerted on the fuel, so that the fuel pump must exert four times pressure on the fuel in order to obtain twice amount of fuel injected into the intake pipe, involving some risk and being the construction complicated. On the other hand, in the latter, it is impossible to control the amount of fuel injected into the intake pipe at optimum value under all continuously variable engine operating conditions, especially during the high-speed operation of the engine. In other words, the fuel injection valve having an enlarged effective cross-sectional area at the opening can not control the intake pipe to supply an air-fuel mixture to the rotary combustion engine at optimum air-fuel ratio. Thus, there is a pressing need for an improved electronically controlled fuel injection system for a rotary combustion engine.

It is accordingly a principal object of the present invention to provide an improved electronically controlled fuel injection system for a rotary combustion engine over-coming the disadvantages of the conventional electronically controlled fuel injection system for a rotary combustion engine.

Another object of the present invention is to provide an improved electronically controlled fuel injection system for a rotary combustion engine which is capable of injecting an optimum amount of fuel into the intake pipe under all continuously variable engine operating conditions, especially during the high-speed operation of the engine.

Still another object of the present invention is to provide an improved electronically controlled fuel injection system which is highly reliable in operation and can easily be installed on existing rotary combustion engine.

Stated briefly, in accordance with an electronically controlled fuel injection system for a rotary combustion engine of the present invention, there are mounted on an intake pipe of the rotary combustion engine a plurality of fuel injection valves which are sequentially actuated in response to sequential command pulse signals from an electronic control means so that they alternate in their injection operation. The electronic control means produces the sequential command pulse signals in response to not only sequential triggering pulse signals from an electric circuitry device but also a pulse signal having a pulse width representing a proper duration for fuel injection under all variable engine operating conditions from an electronic computing means. The sequential triggering pulse signals occur sequentially in dependence on the revolution of the engine crank shaft. The electornic computing means produces the pulse signal in response to at least one of electric signals representing prevailing values of engine operating conditions including engine speed, throttle opening, engine temperature and intake pipe pressure from the corresponding sensors.

Figure 2:
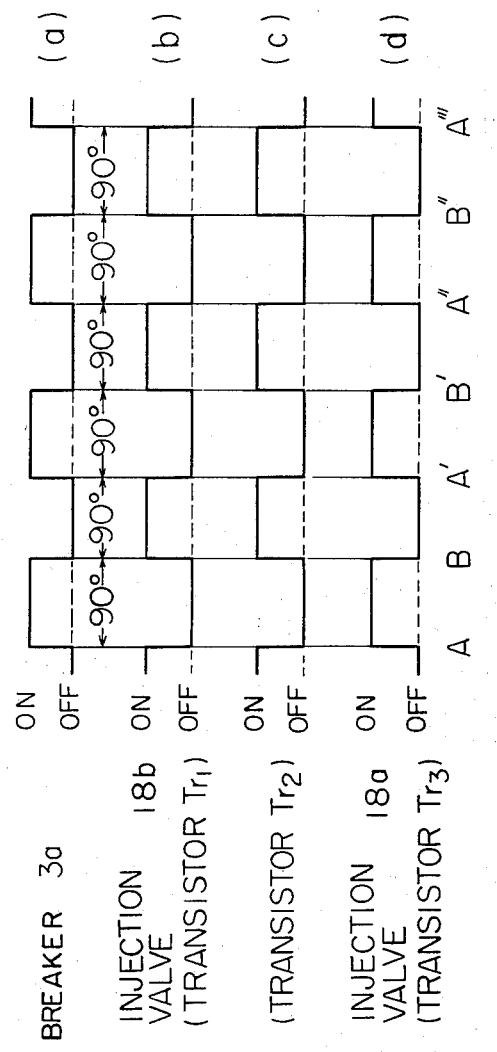

These and other objects and advantages of the present invention will become apparent from the following detailed description taken in conjunction with the accompanying drawings in which:

FIG. 1 is a schematic circuit diagram of a preferred embodiment of an electronically controlled fuel injection system in accordance with the present invention and a rotary combustion engine controlled thereby; and FIG. 2 is a line diagram for illustrating the operations of the electronically controlled fuel injection system shown in FIG. 1.

Referring more particularly to FIG. 1, there is shown an electronically controlled fuel injection system of the present invention and a rotary combustion engine, for example, of the epitrochoid Wankel type which is controlled by the system, the rotary combustion engine being generally indicated by a reference numeral 1. Reference numeral 2 designates a fuel supply system; 3, an electric circuitry device for producing sequential triggering pulse signals; 4, an electronic computing means for producing a pulse signal having a pulse width representing a proper duration for fuel injection under all variable engine operating conditions; and 5, an electronic control means for producing sequential command pulse signals which are employed as a control signal for fuel injection in the rotary combustion engine 1.

As is well known in the art, the rotary combustion engine 1 generally comprises a rotor housing 11, a rotor 12 in the housing 11 and engine crank shaft 13 supporting the rotor 12. The rotor housing 11 is provided with an ignition means such as a spark plug 14 for igniting the air-fuel mixture. The rotor housing 11 is further provided with an intake pipe 15 having an intake port 15' opening into a working chamber 16 and an exhaust pipe 17. The intake pipe 15 is also provided with two fuel injection valves 18a and 18b.

The fuel supply system 2 comprises a fuel tank 21, a fuel pump 22 and a regulator valve 23 serving to keep the pressure exerted on fuel in the pipe line 24 at a predetermined value. The fuel under pressure is led to the two fuel injection valves 18a and 18b mounted on the intake pipe 15 of the engine 1. The electric circuitry device 3 generally comprises an engine driven breaker 3a and an electric switching circuit 3b. The engine driven breaker 3a comprises a cam 31 coupled with the engine crank shaft 13 and two triggering switches composed of a stationary contact 32 and a movable contact 33 grounded. The cam 31 is driven by the engine crank shaft 13 and rotates about a cam shaft 31', the revolution of which is reduced to half from the engine revolution through a reduction gear means (not shown). The cam 31 functions to alternately connect and disconnect the stationary and movable contacts 32 and 33 with each other at intervals of 90° of the revolution of the cam shaft 31', so that the engine driven breaker 3a produces alternate pulse signals in dependence on the revolution of the engine crank shaft 13. The alternate pulse signals are fed to the electric switching circuit 3b which comprises transistors $T_1$, $T_2$ and $T_3$ and resistors $R_1$, $R_2$, - - - , $R_6$. The transistor $T_1$ is connected at the base through the resistors $R_1$ and $R_2$ to a positive terminal of an electric power supply such as a battery $Ba$ so as to be biased thereby. The collector of the transistor $T_1$ is connected through the resistor $R_3$ to the positive terminal of the battery $Ba$, while the emitter of the transistor $T_1$ is connected to an output terminal $OUT_1$ of the switching circuit 3b. The transistor $T_2$ is connected at the base through the resistor $R_4$ to the junction $P_0$ between the resistors $R_1$ and $R_2$. That is, the transistor $T_2$ is biased through the resistor $R_4$ and $R_1$ by the battery $Ba$. The collector of the transistor $T_2$ is connected through the resistor $R_5$ to the positive terminal of the battery $Ba$, while the emitter of the transistor $T_2$ is grounded. The transistor $T_3$ is connected at the base through the resistor $R_5$ to the battery $Ba$ so as to be biased thereby and further connected to the collector of the transistor $T_2$. The collector of the transistor $T_3$ is connected through the resistor $R_6$ to the positive terminal of the battery $Ba$, while the emitter of the transistor $T_3$ is connected to an output terminal $OUT_2$ of the switching circuit 3b. The junction $P_0$ is further connected to the stationary contact 32 of the breaker 3a so that the breaker 3a supplies therefrom the alternate pulse signals through the junction $P_0$ to the bases of the transistors $T_1$ and $T_2$.

The electronic computing means 4 comprises a computing circuit 41 which is responsive to at least one of an electric throttle opening analog signal $\theta$ from a throttle opening sensor 42, an electric engine speed pulse signal from an engine speed sensor 43 through a converter 43' in which the engine speed pulse signal is converted into an electric engine speed analog signal $n$, an electric intake pipe pressure analog signal $p$ from an intake pipe pressure sensor 44, and an electric engine temperature analog signal $t$ from an engine temperature sensor 45 such as a thermistor. The computing circuit 41 is further responsive to an ignition switch signal $i$ from an ignition switch 46 which is connected to a main switch 47. The main switch 47 is connected to the positive terminal of the battery $Ba$. Thus, the computing circuit 41 produces an electronic output pulse signal having a pulse width representing a proper duration for fuel injection under all continuously variable engine operating conditions.

The electronic control means 5 comprises two AND circuits 51 and 52 which are connected to an output of the computing circuit 41 to recieve the pulse signal therefrom, and two amplifiers 53 and 54 which are connected to outputs of the AND circuits 51 and 52 respectively. The AND circuits 51 and 52 are further connected to the outputs $OUT_1$ and $OUT_2$ of the electric circuitry device 3 via lines 34 and 35 respectively to recieve the sequential triggering pulse signals therefrom. Thus, the AND circuits 51 and 52 produce the sequential command pulse signals which are fed through lines 55 and 56 to the actuating means (not shown) for the fuel injection valves 18a and 18b respectively which are sequentially energized by means of the sequential command pulse signals, so that the fuel injection valves 18a and 18b alternate in their injection operation.

When, in operation, the stationary and movable contacts 32 and 33 of the engine driven breaker 3a are connect with each other by the cam 31, a closed circuit composed of the battery $Ba$, the resistor $R_1$ and the contacts 32 and 33 is completed so that current applied by the battery $Ba$ to the bases of the transistors $T_1$ and $T_2$ are short-circuited, rendering the transistors $T_1$ and $T_2$ non-conductive. Therefore, no triggering pulse voltage signal appears at the output $OUT_1$. On the other hand, the transistor $T_3$ is then rendered conductive so that there appears at the output $OUT_2$ a triggering pulse voltage signal which is then fed to the AND circuit 52 through the line 35. The AND circuit 52 then produces an electric pulse voltage signal which is amplified by the amplifier 54. The amplified pulse voltage signal, i.e., a command pulse signal having a pulse width representing a proper duration for fuel injection is fed through the line 56 to the actuating means for the fuel injection valve 18a so as to command the commencement of fuel injection, so that the injection valve 18a effects a fuel injection into the intake pipe 15 of the rotary combustion engine 1.

When, on the other hand, the cam 31 rotates about the cam shaft 31' by 90° of its revolution and the stationary and movable contacts 32 and 33 of the engine driven breaker 3a are then disconnected with each other, as shown, the transistors $T_1$ and $T_2$ are rendered conductive so that there appears at the output $OUT_1$ a triggering pulse voltage signal which is then fed to the AND circuit 51 through the line 34. The AND circuit 51 then produces an electric pulse voltage signal which is amplified by the amplifier 53. The amplified pulse voltage signal, i.e., a command pulse signal having a pulse width representing a proper duration for fuel injection is fed through the line 55 to the actuating means for the fuel injection valve 18b so as to command the commencement of fuel injection. Thus, a fuel injection into the intake pipe 15 is effected through the injection valve 18b. At this moment, the transistor $T_3$ is rendered non-conductive so that no triggering pulse voltage signal appears at the output $OUT_2$, since the transistor $T_3$ is rendered non-conductive.

As described hereinbefore, the actuating means for the fuel injection valves 18a and 18b are sequentially energized by means of the command pulse signals so that the fuel injection valves alternate in their injection operation in dependence on the revolution of the engine crank shaft 13.

FIG. 2 shows a diagram of assistance in explaining the operation of the electronically controlled fuel injection system of the present invention. When the stationary and movable contacts 32 and 33 are connected with each other during the first 90° of the revolution of the cam shaft 31' as shown in FIG. 2a, the transistors $T_1$ and $T_2$ are rendered non-conductive as shown in FIGS. 2b and 2c and the transistor $T_3$ is rendered conductive as shown in FIG. 2d, so that the fuel injection valve 18a starts its fuel injection operation at the point A and continues its operation for the period which is determined by the pulse width, i.e., the distance from the point A to the point B as shown. The fuel injection valve 18b then effects no fuel injection. On the other hand, when the stationary and movable contacts 32 and 33 are disconnected with each other during the next 90° of the revolution of the cam shaft 31' as shown in FIG. 2a, the transistors $T_1$ and $T_2$ are rendered conductive as shown in FIGS. 2b and 2c and the transistor $T_3$ is rendered non-conductive as shown in FIG. 2d, so that the fuel injection valve 18b starts its fuel injection operation at the point B and continues its operation for the period which is determined by the pulse width, i.e., the distance from the point B to the point A' as shown. The fuel injection valve 18a then effects no fuel injection. Thus, the fuel injection valves 18a and 18b alternate in their fuel injection operation by the switching operation of the transistors $T_1$, $T_2$ and $T_3$.

From the foregoing, it will be easily seen that the fuel injection durations of the fuel injection valves 18a and 18b are determined by the electronic computing means 4, and that the commencement of fuel injection is determined by the electric circuitry device 3.

Further, it should be appreciated that the fuel injected into the intake pipe per one revolution of the engine crank shaft is not restricted in its quantity.

Although the two fuel injection valves mounted on the intake pipe of the rotary combustion engine are considered in the above description of the electronically controlled fuel injection system illustrated in the dtawings, it will be readily seen from the spirit of the present invention that the present invention can be applied to the electronically controlled fuel injection system employing a plurality of fuel injection valves mounted on the intake pipe of the engine. Thus, the herein presented detailed description of preferred embodiment of the present invention are for the purpose of explaining the principle thereof only, and are not to be considered as limiting or restricting the present invention, since many modifications may be made by exercise of skill in the art without departing from the scope of the present invention.

What is claimed is:

1. An electronically controlled fuel injection system associated with a rotary combustion engine comprising:
    a plurality of fuel injection valves for supplying fuel to the engine;
    actuating means for actuating each of said fuel injection valves when said means are energized;
    an electric circuitry device which comprises an engine driven triggering means having a cam coupled with a crank shaft of said engine and two contacts of a triggering switch which are alternately connected and disconnected with each other in dependence on the revolution of said crank shaft to produce alternate pulse signals and an electric switching circuit responsive to said alternate pulse signals from said engine driven triggering means to produce sequential triggering pulse signals;
    electronic computing means receiving input signals from at least one of an engine speed sensor, a throttle opening sensor, an engine temperature sensor and an intake pipe pressure sensor to produce an electronic output pulse signal having a pulse width representing a proper duration for fuel injection and corresponding at all times to prevailing engine operating conditions; and
    electronic control means responsive to said output pulse signal from said computing means and said sequential triggering pulse signals from said electric switching circuit of said electric circuitry device to produce sequential command pulse signals which are fed to said actuating means to thereby sequentially actuate said fuel injection valves, wherein said electric switching circuit has first and second transistor circuits which are rendered non-conductive when said contacts of said triggering switch are closed so that no triggering pulse voltage signal appears at a first output terminal of said electric circuitry device and wherein said electric switch circuit has a third transistor circuit which is rendered conductive when said contacts are closed and a triggering pulse voltage signal is delivered from said third transistor circuit to a second output terminal of said electric circuitry device, and said first and second transistor circuit being rendered conductive, to deliver a triggering pulse voltage signal to said first output terminal, when said contacts are open and simultaneously said third transistor circuit is rendered non-conductive so no triggering pulse voltage signal is delivered to said second output terminal wherein said electronic control means has at least two AND circuit simultaneously receiving said electronic output pulse signal from said electronic computing means and, respectively, receiving said triggering pulse voltage signals from said first and second output terminals of said electric circuitry device to thereby sequentially deliver command pulse signals to said actuating means.

* * * * *